United States Patent [19]
Hill et al.

[11] Patent Number: 6,009,897
[45] Date of Patent: Jan. 4, 2000

[54] VALVE LOCK

[76] Inventors: Steven D. Hill, 29 Eaton St., Battle Creek, Mich. 49017; Gregory P. Burrett, 3099 B Dr. South, East LeRoy, Mich. 49051

[21] Appl. No.: 09/124,432

[22] Filed: Jul. 29, 1998

[51] Int. Cl.[7] .................................................. F16K 37/00
[52] U.S. Cl. ........................................... 137/364; 137/382
[58] Field of Search ................................... 137/364, 382, 137/371, 327

[56] References Cited

U.S. PATENT DOCUMENTS

| | | | |
|---|---|---|---|
| 3,227,183 | 1/1966 | Hocbt | 137/364 X |
| 5,871,030 | 2/1999 | Agbey | 137/364 |

*Primary Examiner*—John Fox
*Attorney, Agent, or Firm*—Flynn, Thiel, Boutell & Tanis, P.C.

[57] ABSTRACT

The present invention relates to a valve lock for blocking access to a valve mounted in an access pipe. The valve lock includes a key housing and a key for actuating a valve lock mechanism. The key housing has a diameter less than the inner diameter of the access pipe. The valve lock mechanism includes semi-cylindrical closure wedges having inclined surfaces that are engaged by wedges. The valve lock mechanism is activated by reducing the distances between the wedges forcing the closure wedges radially outwardly so that the outer semi-cylindrical surface of the closure wedges engage the inner wall surface of the access pipe.

8 Claims, 4 Drawing Sheets

VALVE LOCK

FIELD OF THE INVENTION

This invention relates to a valve lock and, more particularly, to a valve lock preventing access through a pipe to a valve and gripping a pipe from the interior thereof.

BACKGROUND OF THE INVENTION

It is desirable to limit access to valve controls mounted in an access pipe, for example water valves sunk underground controlling the flow of water from a water main to a business or home. If water to the business or home is unnecessary or if the water bills have not been paid, it is necessary to not only turn off the valve preventing water flow to the user, but also block access to the valve thereby preventing unauthorized access thereto.

A prior valve lock is shown in FIGS. 6–8. Referring now to FIG. 6, there is shown a valve lock 15 mounted at one end of an elongate hollow shaft 17 that has a key housing 19 threadedly engaged at the other end thereof as at 20. This entire structure is receivable in an access pipe leading to a water valve. A shaft 21 extends longitudinally through the key housing 19 and terminates in a key 21 oriented in the hollow pipe 17 for engaging a keyway 22 on an elongate drive shaft 23. The drive shaft 23 operates the valve lock 15 effecting a lock or unlock of same to or from an access pipe 25. The valve lock 15 includes movable plates 26 and fixed plates 27, whereby the movable plates cause locking engagement of the valve lock 15 against the ID surface of the access pipe 25. Guide pins 28 are fixedly mounted in the fixed plates 27 and are received in elongate slots 29 in the upper portion of the movable plates 26 whereby the upper part of the movable plates 26 are guided for radially inward and outward movement on the pins. The movable plates 26 have inclined surfaces 31 at the lower end thereof which are engaged by correspondingly shaped surfaces on a wedge 33 which is movable in response to the rotation of the drive shaft 23 so that the surfaces on the wedge 33 engage the inclined surfaces 31 to drive the movable plates 26 outwardly against the return force of an elastically yieldable rubber ring 34 so that the relatively narrow outer wall of each of the movable plates is forced against the inner wall of the access pipe 25 (FIG. 8). As the key 21 turns the drive shaft 23 the valve lock 15, and more specifically, the radially outwardly facing edge of the movable plates 26, engage the ID surface of the access pipe along a relatively small surface area of the access pipe.

This prior valve lock has the drawback that it does not provide a sufficient surface contact to the ID surface of the access pipe for preventing unintended removal of the valve lock.

Accordingly, it is an object of this invention to provide an improved valve lock that has an increased surface contact to the ID surface of the access pipe.

It is also an object of this invention to apply an outwardly directed force, holding the valve lock in the access pipe, more uniformly distributed around the outer circumference of the valve lock so as to prevent forced manipulation of the valve lock without the assistance of a key.

SUMMARY OF THE INVENTION

The objects and purposes of this invention are met by providing a valve lock for preventing access to a valve and for gripping pipes from the interior, for example, a water valve located in an access pipe, except when a special unlocking key is available. The valve lock includes semi-cylindrical closure wedges which are engaged at opposite ends thereof by further wedges so that the outward displacement of the closure wedges and force with which the closure wedges engage the inner surface of the access pipe is determined by the distance between the further wedges. The distance between the further wedges is controlled by a key device which allows one to turn a lock actuation shaft on which the further wedges are mounted.

BRIEF DESCRIPTION OF THE DRAWINGS

A preferred embodiment of the present invention will be described in detail hereinafter with reference to the accompanying drawings, in which.

Figure 1:
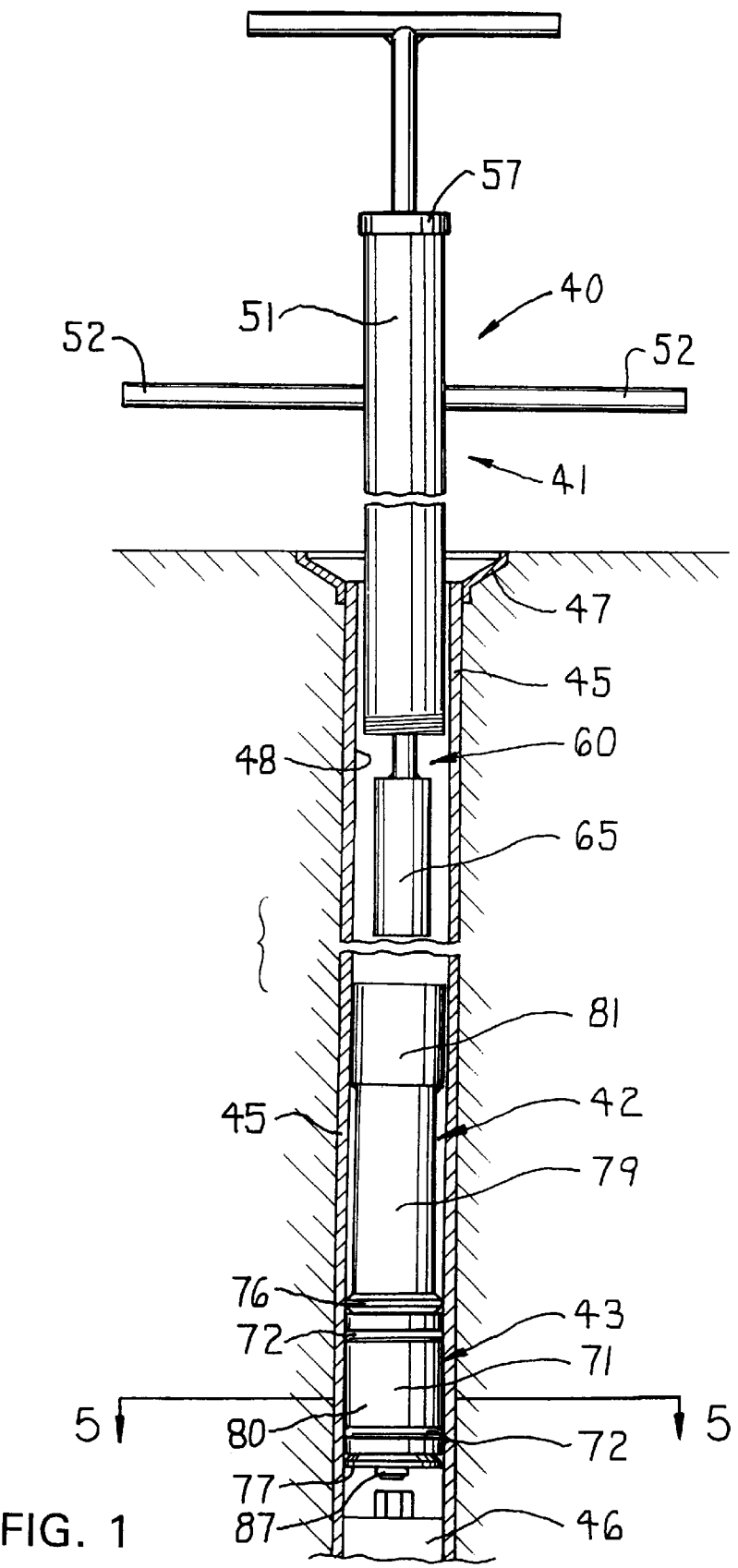
FIG. 1 is a side view of the locking mechanism according to the present invention oriented inside an access pipe.
Figure 2:
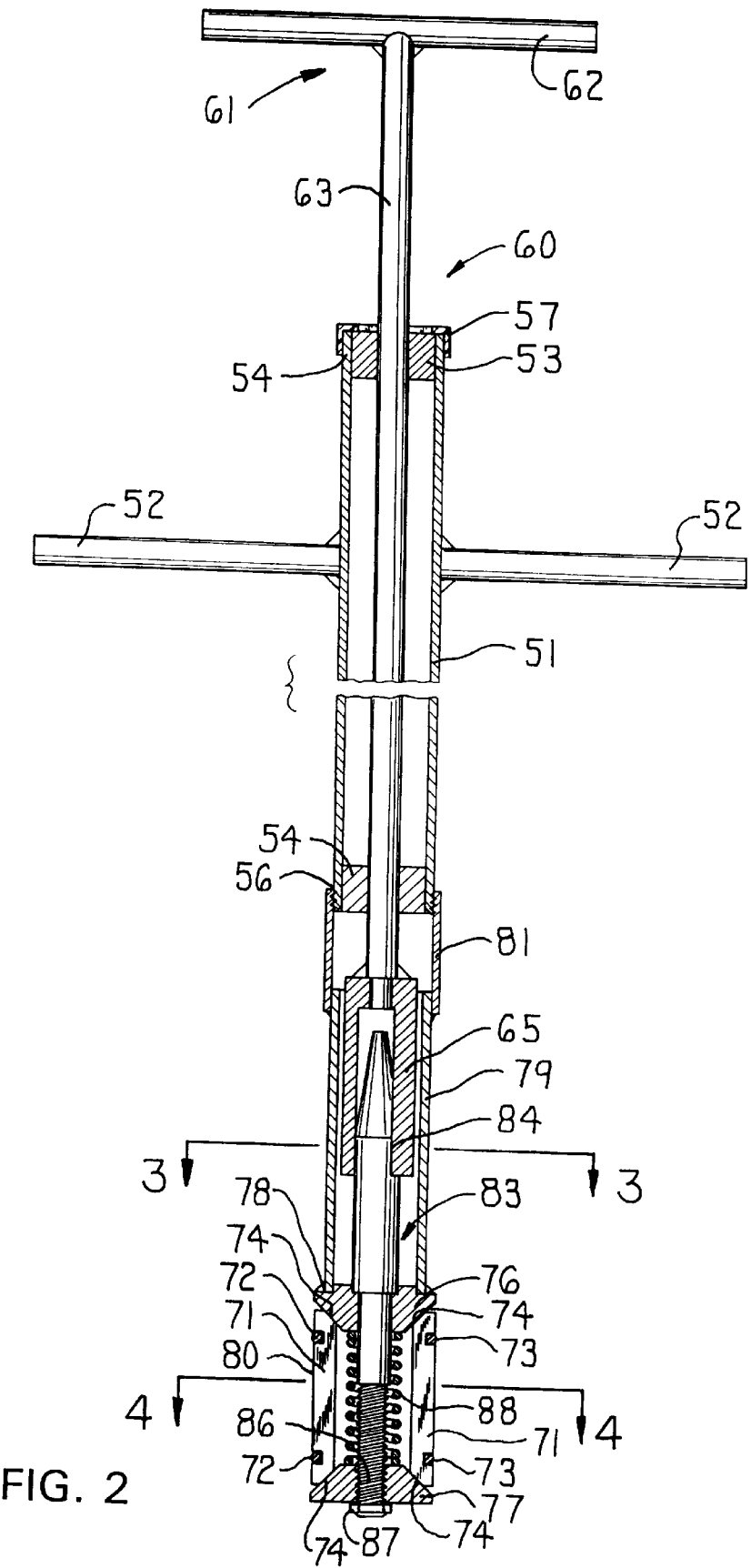
FIG. 2 is a central cross sectional view of the FIG. 1 locking mechanism.

Certain terminology will be used in the following description for convenience and reference only and will not be limiting. The words "up", "down", "right", and "left" will designate directions in the drawings to which reference is made. The words "in" and "out" will refer to directions toward and away from, respectively, the geometric center of the device and designated parts thereof. Such terminology will include derivatives and words of similar meaning.

DETAILED DESCRIPTION

FIG. 1 shows the valve lock 40 of the present invention and for convenience of description thereof, it is divided into three sections, namely a key housing section 41, a valve lock extension pipe section 42, and a valve lock mechanism section 43, all of which are adapted to be received in an access pipe 45 containing a valve, here a water valve 46. The access pipe 45 is normally oriented vertically upright and provides access through the ground to the water valve 46 oriented adjacent the lower end. The access pipe 45 is usually a 2 inch inner diameter metal pipe having a head 47 at or near ground level which can receive a seal cap therein. However, the present invention may be modified to block access pipes having diameters ranging from about ⅞" to about 6". The key housing 41 is joined to the valve lock mechanism 43 through the extension pipe 42 for inserting or removing the valve lock mechanism 43 from the access pipe 45. The valve lock mechanism 43 engages the inner wall 48 of the access pipe to block access to the valve 46.

The key housing 41 includes an elongate cylindrical hollow pipe 51 having rod-like handles 52 fixedly secured by any suitable securement, here shown at 55 as a weldment, to the outside of pipe 51 so that the handles extend radially outwardly from opposed sides of the pipe 51. Bearings or bushings 53 are mounted in the interior of the pipe 51 at the top and bottom ends 54, 56 thereof. The top end 54 has a cap 57 thereon which closes off the upper end of the pipe 51 and has a hole therethrough, the edge of which closely surrounds the outer surface of the pipe 51. In a preferred embodiment, the cap 57 is a plastic cap in which an X-shaped slit is cut in the top wall for receiving a key device 60 therethrough. The bottom end 56 of the pipe 51 is externally threaded. The key device 60 is mounted on the key housing 41 and includes a T-shaped handle 61 having a cross member 62 upwardly spaced from the cap 57 for engagement by user's hands and having an upright shaft member 63 extending through the aperture in the cap 57 and being rotatably mounted in the vertically spaced apart bushings 53 and 54. The upright member 63 is elongate and extends, respectively, upwardly and downwardly beyond the top and bottom pipe ends 54, 56. At its end remote from the cross member 62, namely, the bottom end, the upright member 63 has a hollow cylindrical key 65 mounted thereon. The key 65 has a closed end fixed to the upright member 63 by any suitable fixation, here shown at 68 as a weldment, and is open at the other end. The key 65 has an open interior 66 defined by a semi-circular portion 67 and a flat portion 68 which define the engaging key surfaces.

Figure 4:
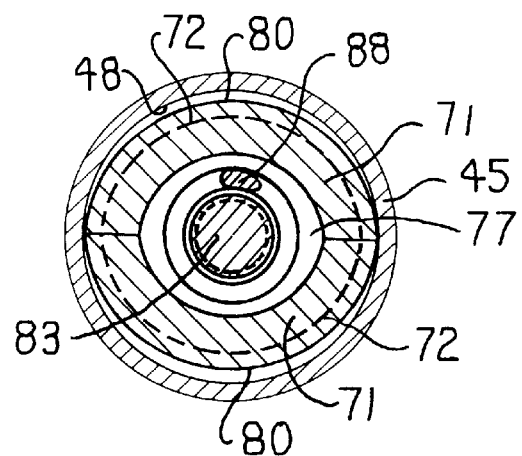
FIG. 4 is a cross sectional view taken generally along the line 4—4 in FIG. 2.
Figure 5:
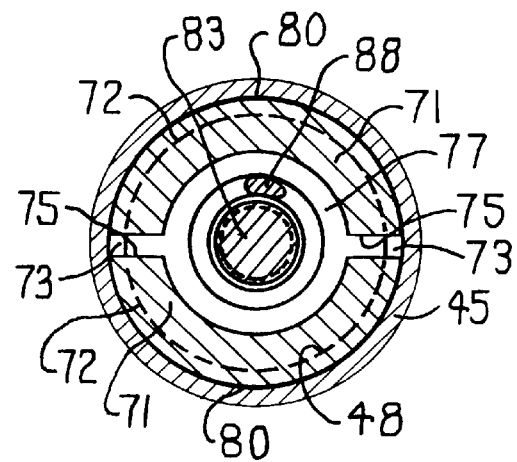
FIG. 5 is a cross sectional view taken generally along the line 5—5 in FIG. 1.
Figure 7:
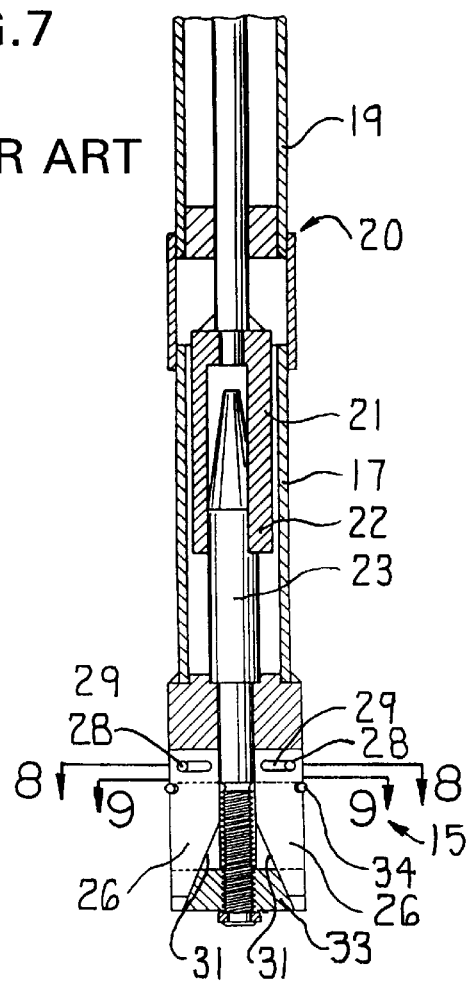
FIG. 7 is a central cross sectional view of a prior valve lock mechanism.

Turning now to the valve lock mechanism 43, it includes semi-cylindrical, elongate closure wedges 71 that have a pair of vertically spaced, semi-annular grooves 72 inset into the outer surface thereof. As illustrated, one groove 72 is inset adjacent each longitudinal end of the closure wedges. The grooves 72 receive O-rings 73 holding the two closure wedges 71 together. The O-rings 73 are elastic, and preferably rubber, so that the O-rings can expand with the closure wedges 71 when the closure wedges move radially outwardly into the locked position and can contract the closure wedges to move the closure wedges radially inwardly into the unlocked position. As shown, there are two closure wedges 71 (FIG. 4), the outer surfaces 80 of which define a generally circular shape when in the locked position, i.e. engaging the internal diameter surface 48 of the access pipe 45. It is within the scope of the present invention to have any number of a plurality of closure wedges 71. In the unlocked position, the outer surfaces 80 of the closure wedges 71 define an elliptical shape having the length of its major axis at least slightly less than the inner diameter of the access pipe 45. The closure wedges 71 can be machined from a hollow cylindrical pipe by cutting the pipe diametrically and removing a portion of the pipe on each side of the diameter cut. For example, to create closure wedges 71 for use in a valve lock 43 that will lock a standard two inch inner diameter access pipe, a hollow cylinder having an outer diameter of two inches is diametrically cut into at least two semi-cylindrical closure wedges 71. The cut 75 separating the hollow cylinder into the two closure wedges 71 is at least 0.12 inch wide so that the closure wedges each have an outer arcuate surface essentially corresponding to the inner diameter of the access pipe (FIG. 5), i.e. a two inch radius, and the two closure wedges in the unlocked position have a major axis less than the diameter of the access pipe (FIG. 4), i.e. less than two inches so that the closure wedges can be received in the access pipe in the illustrated embodiment. The outer diameter of the closure wedges 71 in the locked position generally match the inner diameter of access pipe 45 which can range from about 7/8" to about 6". Each end of the closure wedges 71 has inclined surfaces 74 which are cut or beveled into the interior portion of the closure wedges 71 and incline radially outwardly toward each respective end of the closure wedges. Frustoconical shaped base and thrust wedges 76, 77 are mounted at each end of the closure wedges 71 with the small diameter ends being adjacent the closure wedges 71. Thus, the base and thrust wedges 76, 77 are spaced apart at a distance determined by the length of the closure wedges 71 mounted between the base and thrust wedges 76, 77. The wedges 76, 77 have inclined surfaces 78 respectively facing the inclined surfaces 74 of the closure wedges 71, which are adapted to slide against one another effecting a radial displacement of the closure wedges 71. The angle of the facing inclined surfaces 74, 78 determines the rate at which the closure wedges 71 are radially displaced by riding on the inclined surfaces 78 of the base and thrust wedges 76, 77. The wedges 76, 77 each have coaxial central apertures extending longitudinally therethrough. The aperture in the lower, thrust wedge 77 is threaded. The upper, base wedge 76 has a circumferentially extending seat 78 at its large diameter end.

Figure 6:
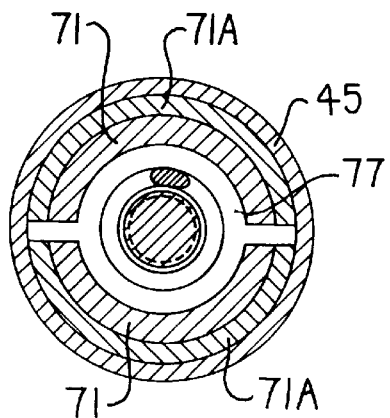
FIG. 6 is a view similar to FIG. 5 with the valve lock mechanism including expansion shoes.
Figure 8:
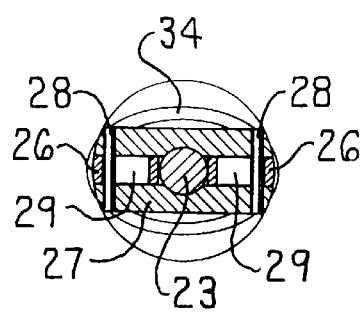
FIG. 8 is a sectional view taken along the line 8—8 in FIG. 7.
Figure 9:
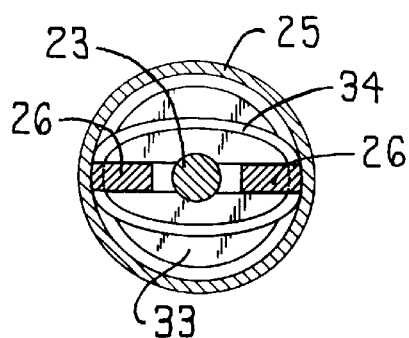
FIG. 9 is a cross sectional view taken generally along the line 9—9 in FIG. 7.

The wedges 71 may also receive expansion shoes 71A thereon (FIG. 6). the expansion shoes 71A are semi-cylindrical so that the outer surface thereof has generally the same diameter as the inner diameter of pipe 45. Thus, the expansion shoes 71A essentially extend the radial thickness of the wedges 71 to adapt a valve lock mechanism 43 to a pipe 45 having a greater inner diameter than the wedges 71 have in the locked position.

A hollow, cylindrical extension pipe portion 79 of the valve lock extension pipe 42 is fixedly received by any suitable fixation, here shown at 82 as a weldment, in the base wedge seat 78. The extension pipe portion 79 has a diameter slightly less than the large diameter end of base wedge 76 and extends axially upwardly away from wedge 76. A mounting pipe portion 81 of the valve lock extension pipe 42 is fixedly secured by any suitable fixation at an upper end of extension pipe portion 79 remote from the base wedge 76. Pipe portions 79, 81 may be welded together as shown at 85. The mounting pipe portion 81 has an inner diameter slightly greater than the outer diameter of extension pipe portion 79 so that the mounting pipe portion 81 is fitted over the extension pipe portion 79. However, both pipe portions 79, 81 must have an outer diameter less than the inner diameter of the access pipe 45 so that the portions 79, 81 are slidably receivable in the access pipe. The mounting pipe portion 81 is internally threaded at its upper end remote from the extension pipe portion 79 and the threads thereof are adapted to threadably receive the externally threaded bottom end 56 of the pipe 51. The inner diameters of the pipe portions 79, 81 are at least slightly greater than the outer diameter of key 65 so that the key 65 is rotatably and axially movable in the pipe portions 79, 81.

Figure 3:
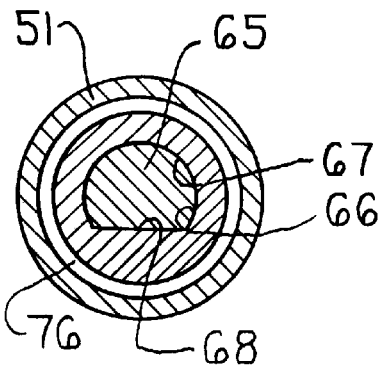
FIG. 3 is a central cross sectional view taken generally along the line 3—3 in FIG. 2.

An elongate lock actuation drive shaft 83 extends into the interior of the extension pipe portion 79, and extends through the central apertures in the base and thrust wedges 76, 77 and through the hollow interior defined by the closure wedges 71. The upper end portion of the drive shaft 83 is conical in shape to assist in guiding the key 65 into coaxial alignment with the shaft 83 and to protect the shaft 83 against unauthorized engagement, i.e. it is tamper resistant. The shaft 83 has a keyway 84 in the upper end portion thereof within the interior of the extension pipe 79. The keyway 84 has surfaces for matingly receiving the key 65 therein for effecting a rotation of the shaft 83 (FIG. 3). A lower end portion 86 of the shaft 83 is externally threaded for threaded engagement with the aperture in the thrust wedge 77. A securement device 87 is secured to the shaft lower end portion 86 on a side of the thrust wedge 77 remote from the closure wedges 71 to thereby support the lower thrust wedge 77, and hence the closure wedges 71 and base wedge 76, onto the shaft 83. For example, the securement device 87 may be a locking nut, snap ring, or a roll pin. A spring 88 is coaxially mounted over the shaft 83 between the small diameter ends of the wedges 76, 77 acting to force the wedges axially away from each other.

While the operation of the valve lock 40 according to the present invention will be readily apparent to one skilled in this art, a brief description of the operation is provided for convenience.

When it is desired to insert the valve lock mechanism 43 into an access pipe 45, the key housing 41 is threadedly engaged to the mounting pipe portion 81, thus joining the key housing 41 and valve lock mechanism 43 together. The entire valve lock 40 including the joined key housing 41 and valve lock mechanism 43 is inserted into the access pipe 45 by a person gripping the handles 52 and lowering valve lock system 40 into the pipe 45. Once the valve lock mechanism 43 has reached a sufficient depth into the pipe 45 the downward insertion motion is stopped, i.e. at least when the top of the valve lock extension pipe 42 is fully inserted into the access pipe 45.

Now, the user must activate the valve lock mechanism 43 to secure it to the inner walls of the pipe 45. The user engages the T-shaped handle 61 to align the key 65 with the keyway 84 of the lock actuation shaft 83. Once aligned, the key 65 slides downwardly into the keyway 84 to rotatably, removably secure the key 65 to the lock actuation shaft 83. Then, the user rotates the handle 61 relative to the key housing 41 about the axis of the shaft 63 so that rotating the handle 61 does not separate the key housing 41 from the mounting portion 81 of the extension pipe 42. By turning the handle 61 and key 65, the actuation shaft 83 rotates and the external threads on the actuation shaft lower end portion 86 threadedly engaged to the internal threads on the lower thrust wedge 77 so that the lower thrust wedge 77 moves upwardly toward the upper base wedge 76 and against the return force of the compression spring 88. The reduction in the separation distance between the wedges 76, 77 forces the closure wedges 71 radially outwardly against the elastic force of the O-rings 73 as the inclined surfaces 74 ride on the outer surface of frustoconical wedges 76, 77 toward the large diameter end thereof. This continues until the semi-cylindrical surfaces 80 on the closure wedges 71 securely engage the inner wall surface 48 of the access pipe 45 by a pressure fit, compressing the O-rings 73 into the grooves 72.

Once the valve lock mechanism 43 is secured to the access pipe 45, the key housing 41 must be removed from the access pipe. The user rotates the key housing 41 relative to the extension pipe 42 by rotating handles 52, the extension pipe being fixedly and nonrotatably secured to the access pipe 45. By rotating the handles 52, the pipe 51 rotates to remove its threads from the threads in the mounting pipe portion 81. After the threads are disengaged, the key housing 41 along with the key device 60 are removed from the access pipe 45 leaving the valve lock mechanism 43 and extension pipe 42 fixedly secured in the access pipe 45 blocking access to the valve 46.

To remove the valve lock mechanism 43 from an access pipe 45 thereby providing access to the valve 46, the key housing 41 and key device 60 are inserted into the access pipe. The key housing 41 is rotated so that the threads at the bottom end 56 of the pipe 51 engage in the internal threads in the mounting pipe portion 81 to secure the key housing 41 and key device 60 to the extension pipe 42 and valve lock mechanism 43. The key 65 engages the keyway 84 and the lock actuation shaft 83 is thereby rotated so that the thrust wedge 77 moves away from the base wedge 76. This movement is assisted by the spring 88 which forces the base and thrust wedges 76, 77 away from each other. The semi-cylindrical surfaces 80 on the closure wedges 71 disengage from the inner wall surface 48 of the access pipe 45 and are free to radially retract due to a contraction of the rubber rings 73. Once the valve lock mechanism 43 is no longer fixedly secured to the access pipe 45, the entire valve lock 40 including the key housing 41, valve lock extension pipe 42, and valve lock mechanism 43 are withdrawn from the access pipe 45, resulting in clear access to the valve 46 through the access pipe.

If the valve lock 40 is to be used as a pulling device for removing pipe 45, then it is secured to the pipe 45 as discussed above. However, the key housing 41 remains secured to the extension pipe 42 and thus the valve lock mechanism 43 that is secured to the I.D. of pipe 45. The handles 52 are gripped, for example by mechanical or manually, and an upward force is applied thereto pulling the valve lock 40 and pipe 45 from the ground.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A valve lock for removably blocking an access pipe to an underground valve, comprising:
   a cylindrical hollow pipe;
   a plurality of closure wedges at the ends thereof having first and second wedge surfaces, said closure wedges each having a semi-cylindrical outer surface;
   a base wedge fixed to an end of said pipe, the base wedge having a first closure wedge-engaging surface facing said first wedge surface;
   a thrust wedge longitudinally spaced from said base wedge by said plurality of closure wedges, said thrust wedge having a second closure wedge-engaging surface facing said second wedge surface;
   an actuation device engaged to said thrust wedge driving said second closure wedge-engaging surface against said second surface and said first surface against said first closure wedge engaging-surface forcing said plurality of closure wedges radially outwardly,
   whereby said semi-cylindrical outer surfaces of said closure wedges engage an inner wall surface of the access pipe over a significant circumferential extent of the inner wall surface.

2. The valve lock according to claim 1, wherein said actuation device is an elongate shaft having a first end, said first shaft end having external threads, said thrust wedge has an internally threaded aperture therein threadedly engaging said first shaft end, whereby said thrust wedge moves axially along said shaft in response to rotation thereof changing the distance between the thrust and base wedges to radially move said closure wedges.

3. The valve lock according to claim 2, wherein said shaft has a second end, said second shaft end having a keyway therein, and a key is removably received in said keyway for rotating said shaft effecting axial movement of said thrust wedge reducing the distance between said thrust and base wedges forcing said closure wedges radially outwardly against an access pipe.

4. The valve lock according to claim 3, wherein an end of the pipe remote from the base wedge is internally threaded, and an elongate key housing has an external thread removably engaged to the threaded end of the pipe, said key being mounted on said key housing for removable engagement with said keyway with said key housing engaged to said end of said pipe.

5. The valve lock according to claim 4, wherein the base and thrust wedges are frustoconical and have the small diameter ends adjacent respective ends of said closure wedges.

6. The valve lock according to claim 3, wherein said closure wedges have semi-annular grooves extending circumferentially around the outside thereof and have seal rings seated in said grooves and extend radially outwardly of the outer surface of the closure wedges.

7. The valve lock according to claim 1, wherein a spring is mounted between said thrust and base wedges to bias said thrust and base wedges away from each other.

8. In combination, an access pipe to a water valve and a lock mechanism for blocking said access pipe preventing access to the water valve, the lock mechanism comprising:

a cylindrical hollow pipe;

a plurality of closure wedges at the ends thereof having first and second wedge surfaces, said closure wedges each having a semi-circular outer surface;

a base wedge fixed to an end of said pipe, the base wedge having a first closure wedge-engaging surface facing said first wedge surface;

a thrust wedge longitudinally spaced from said base wedge by said plurality of closure wedges, said thrust wedge having a second closure wedge-engaging surface facing said second wedge surface;

a shaft engaged to said thrust wedge driving said second closure wedge-engaging surface against said second surface and said first surface against said first closure wedge engaging-surface forcing said plurality of closure wedges outwardly, whereby said semi-circular outer surfaces of said closure wedges engage an inner wall of the access pipe over a significant circumferential extent of the inner wall.

* * * * *